United States Patent
Ostrowski (10) Patent No.: US 9,432,336 B2
(45) Date of Patent: Aug. 30, 2016

(54) SECURE ELECTRONIC DEVICE APPLICATION CONNECTION TO AN APPLICATION SERVER

(71) Applicant: BLACKBERRY LIMITED, Waterloo (CA)

(72) Inventor: Gregg Ostrowski, Branchville, NJ (US)

(73) Assignee: BlackBerry Limited, Waterloo, Ontario (CA)

( * ) Notice: Subject to any disclaimer, the term of this patent is extended or adjusted under 35 U.S.C. 154(b) by 136 days.

(21) Appl. No.: 13/766,107

(22) Filed: Feb. 13, 2013

(65) Prior Publication Data

US 2014/0230041 A1    Aug. 14, 2014

(51) Int. Cl.
| | |
|---|---|
| G06F 9/00 | (2006.01) |
| G06F 15/16 | (2006.01) |
| G06F 17/00 | (2006.01) |
| H04L 29/06 | (2006.01) |
| G06F 21/44 | (2013.01) |
| G06F 21/60 | (2013.01) |
| H04W 12/06 | (2009.01) |
| H04L 29/08 | (2006.01) |

(52) U.S. Cl.
CPC ............. H04L 63/029 (2013.01); G06F 21/44 (2013.01); G06F 21/606 (2013.01); H04L 63/0272 (2013.01); H04L 63/08 (2013.01); H04L 63/166 (2013.01); H04L 67/2842 (2013.01); H04W 12/06 (2013.01)

(58) Field of Classification Search
CPC . H04L 63/02; H04L 63/029; H04L 63/0884; H04L 12/4633; H04L 29/06625; H04L 29/1257; H04L 61/2592; H04L 63/16; H04L 63/166
See application file for complete search history.

(56) References Cited

U.S. PATENT DOCUMENTS

| | | | |
|---|---|---|---|
| 6,324,648 B1* | 11/2001 | Grantges, Jr. ........... | H04L 63/02 709/229 |
| 6,954,790 B2 | 10/2005 | Forslow | |
| 7,444,508 B2 | 10/2008 | Karjala et al. | |
| 8,079,059 B1* | 12/2011 | Lee .......................... | H04L 63/02 709/203 |
| 8,144,678 B1 | 3/2012 | Breau et al. | |
| 8,275,356 B2 | 9/2012 | Hickie | |
| 8,549,300 B1* | 10/2013 | Kumar .................. | H04L 9/3247 713/153 |
| 8,855,012 B1* | 10/2014 | Suri ..................... | H04L 12/2856 370/254 |

(Continued)

FOREIGN PATENT DOCUMENTS

| | | |
|---|---|---|
| WO | 2008105945 A2 | 9/2008 |
| WO | 2010054258 A1 | 5/2010 |

OTHER PUBLICATIONS

Extended European Search Report mailed Apr. 14, 2014; in European patent application No. 14154601.0.

*Primary Examiner* — Daniel Potratz
(74) *Attorney, Agent, or Firm* — Fish & Richardson P.C.

(57) ABSTRACT

The present disclosure presents a system, method and apparatus for creating a secure tunnel between a mobile device and a server. The server can be configured to receive authentication information from the mobile device. The server can be further configured to establish a secure tunnel between the server and mobile device through at least one firewall in response to verification of the authentication information, the secure tunnel allowing the mobile device direct access to at least one application associated with the server. Additionally, the server can be configured to provide, to the mobile device, data associated with the at least one application.

21 Claims, 4 Drawing Sheets

(56) References Cited

U.S. PATENT DOCUMENTS

| | | | |
|---|---|---|---|
| 2003/0046586 A1* | 3/2003 | Bheemarasetti et al. | 713/201 |
| 2005/0120082 A1 | 6/2005 | Hesselink et al. | |
| 2006/0031929 A1* | 2/2006 | Saito | 726/11 |
| 2007/0300289 A1 | 12/2007 | Tanizawa et al. | |
| 2010/0161960 A1* | 6/2010 | Sadasivan | H04L 63/1408 713/152 |
| 2011/0051932 A1 | 3/2011 | Hoover et al. | |
| 2011/0289308 A1 | 11/2011 | Sobko et al. | |
| 2012/0131685 A1 | 5/2012 | Broch et al. | |
| 2012/0159607 A1 | 6/2012 | Wei et al. | |
| 2012/0284786 A1* | 11/2012 | Somani | H04L 63/0815 726/7 |

* cited by examiner

SECURE ELECTRONIC DEVICE APPLICATION CONNECTION TO AN APPLICATION SERVER

FIELD

The present disclosure relates generally to providing a secure tunnel between an electronic device and an application server.

BACKGROUND

Mobile electronic devices can be configured to perform a wide range of tasks including accessing remote resources. While mobile electronic devices can be configured to include remote access, the remote access is enabled over a virtual private network or a management service, e.g., a mobile device management service. A mobile device management service can be enabled to allow remote access, by the mobile electronic device, to corporate network resources and to manage the mobile electronic device. A virtual private network requires opening ports in a firewall to allow access through the firewall.

BRIEF DESCRIPTION OF THE DRAWINGS

A description is provided herein with reference to specific examples illustrated in the appended drawings. These drawings depict only example implementations of the disclosure and are not intended to limit the scope of the disclosure.

DETAILED DESCRIPTION

Various examples are provided herein. While specific examples are discussed, it should be understood that this is for illustration purposes only. A person skilled in the relevant art will recognize that other components and configurations may be used without departing from the spirit of the disclosure.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The phrase "coupled" is defined as connected, whether directly or indirectly through intervening components, and is not necessarily limited to physical connections. For example, coupled devices can include devices which are in signal communication with one another. The term "communicatively coupled" is defined as connected, whether directly or indirectly through intervening components, is not necessarily limited to a physical connection, and allows for the transfer of data.

The term "electronic device" is defined as any device that is capable of at least accepting data and executing commands. In at least one embodiment, the electronic device can be configured to transmit data. In another embodiment, the electronic device can be configured to receive data. In yet another embodiment, the electronic device can be configured to transmit and receive data. Some examples of electronic devices can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands. The term "mobile device" is defined as any electronic device that is capable of at least accepting information entries from a user and includes the device's own power source.

The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The term "medium" refers to memory or a storage device. The medium can be transitory or non-transitory. In one specific example the medium includes tangible and/or non-transitory computer-readable storage medium for carrying or having computer-executable instructions or data structures stored thereon. Such non-transitory computer-readable storage medium can be any available medium that can be accessed by a general purpose or special purpose computer, including the functional design of any special purpose processor. By way of example, and not limitation, such non-transitory computer-readable medium can include RAM, ROM, EEPROM, CD-ROM or other optical disk storage, magnetic disk storage or other magnetic storage devices, or any other medium which can be used to carry or store computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable medium.

The term "application server" is defined as one or more hardware devices or software components that are configured to execute instructions or is a set of instructions residing on one or more hardware components. An "application" is computer software that is designed to help the user perform specific tasks. An application includes instructions that can be executed by an electronic device. For example, a processor of the electronic device can execute instructions for the application. Additionally, the application can be stored on a storage medium including memory. Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

The term "secure coupling" refers to the communicative coupling of two devices through or by the action of at least one additional device, such that the communication between the two devices is secured at least through encryption. When two devices are securely coupled, the communication therebetween cannot be effectively intercepted without unencrypting the communication.

A "wireless communication" means communication that occurs without wires using electromagnetic radiation.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote medium.

Systems, devices and methods are presented herein for enabling secure coupling of a mobile device with an application server.

Figure 1:
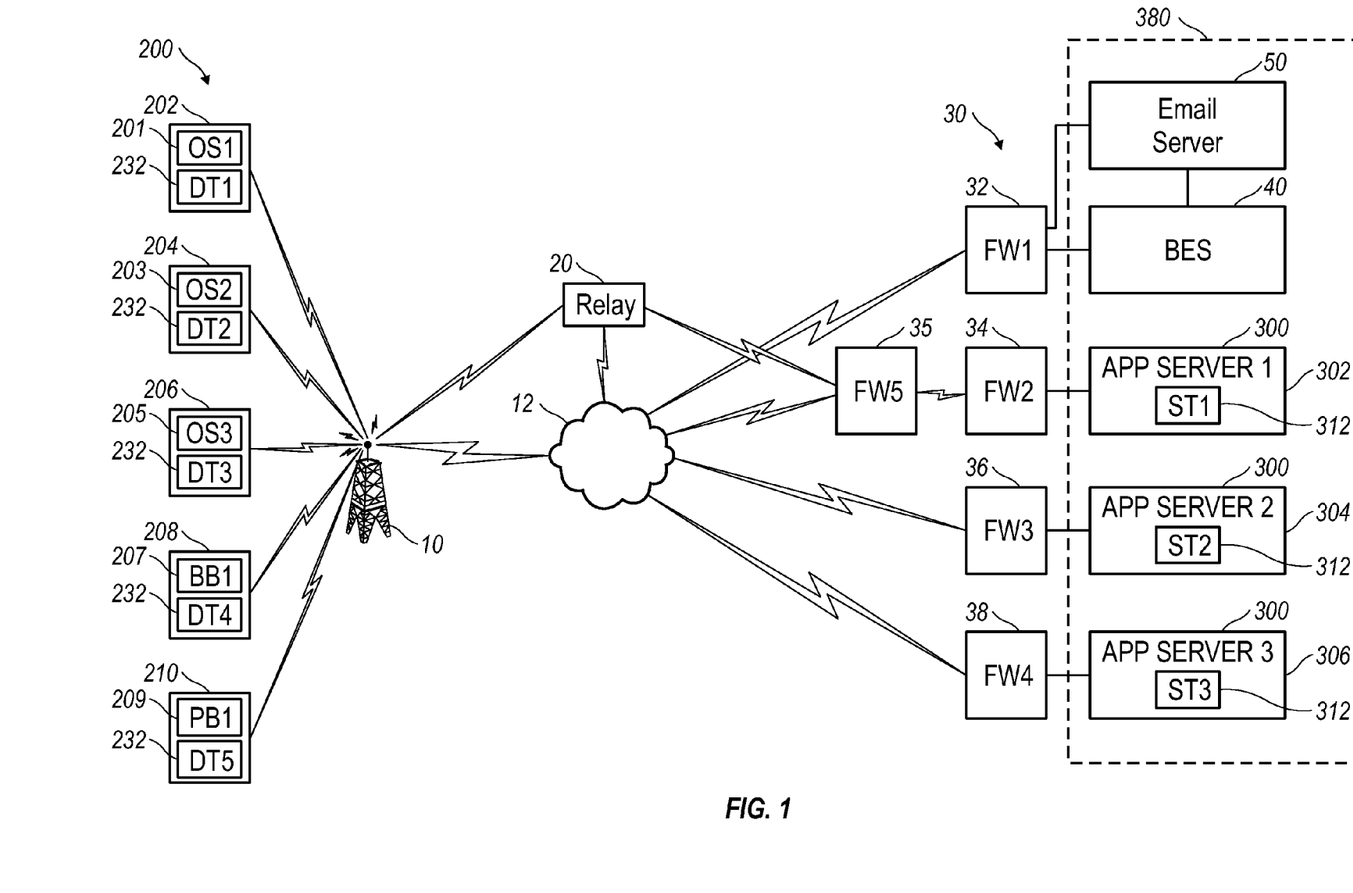
FIG. 1 is a block diagram of a system coupling one or more mobile devices with one or more servers in accordance with an exemplary embodiment.

FIG. 1 illustrates a block diagram of a system coupling one or more mobile devices with one or more servers in accordance with an exemplary embodiment. As illustrated, a plurality of mobile devices 200 can be configured so that each communicates through a wireless network 10 to the internet 12. In other embodiments, the mobile devices 200 can be configured to communicate to the internet through another type of communication network, which can be optionally communicatively coupled to the internet 12. For example, the mobile devices 200 can be communicatively coupled to the internet through a local area network or a 802.11 based network, each of which can be communicatively coupled to the internet 12 via an internet service provider. In at least one embodiment, a relay 20 can be communicatively coupled to the internet 12. The relay 20 can be configured to provide a secure connection and routing of data from at least one of the plurality of mobile devices 200 to one or more application servers 300. The relay 20 can be configured such that it maintains a secure coupling with at least one of the plurality of mobile devices 200 and at least one application server 300. While mobile devices 200 are illustrated, the present technology can equally apply to other electronic devices.

When data is transmitted from a mobile device 200 to an application server 300, the data can be transmitted from the mobile device 200 through the wireless network 10. The wireless network 10 can transmit the data to the internet 12. In one or more embodiments, the data is then transmitted to a relay 20 and then back to the internet 12 where it passes through a firewall 30 before being received by the application server 300. In at least one embodiment, the relay can be omitted such that the data is transmitted entirely over the internet 12.

In at least one embodiment, the relay 20 can be configured to be securely coupled to a BLACKBERRY Enterprise Server (BES) 40 and/or directly to an email server 50. The BES 40 and email server 50 can also be located behind one or more firewalls 30, such as a first firewall 32.

The present technology can be implemented with one or more firewalls 30. The present technology can function when two or more firewalls are present between the internet 12 and the application server 300, for example a first application server 302 can be located behind two firewalls 30. As illustrated in FIG. 1, there is an inner firewall 34 and an outer firewall 35. The second application server 304 is located behind a third firewall 36, and the third application server 306 is located behind a fourth firewall 38. In other embodiments, the one or more firewalls 30 can be provided together for the entire enterprise network 380.

As illustrated in FIG. 1, there are three application servers 300. The first application server 302 includes a server tunneling module 312 and is located behind firewall 34. The second application server 304 also includes a server tunneling module 312 and is located behind firewall 36. The third application server 306 also includes a server tunneling module 312 and is located behind firewall 38. In yet another embodiment, a single firewall (not shown) can be located between the individual firewalls 30 and the internet 12. While only firewalls 30 are illustrated, the present technology can be configured to securely couple at least one mobile device 200 to at least one server 300 through other devices and associated software settings.

In at least one embodiment, the present technology can be configured to operate independently of the operating system of the mobile device 200. As illustrated in FIG. 1, five different mobile devices 200 are illustrated. The mobile devices 200 can be configured to run device operating system specific applications. In other embodiments, the mobile devices 200 can run applications that are independent of the operating system running on the mobile device 200. In the illustrated embodiment, the first mobile device 202 runs a first operating system 201. The first mobile device 202 can further include a device tunneling module 232. The second mobile device 204 runs a second operating system 203. The second mobile device 204 can further include a device tunneling module 232. The third mobile device 206 runs a third operating system 205. The third mobile device 206 can further include a device tunneling module 232. The fourth mobile device 208 runs a fourth operating system 207. The fourth mobile device 208 can further include a device tunneling module 232. The fifth mobile device 210 runs a fifth operating system 209. The fifth mobile device 210 can further include a device tunneling module 232.

The operating systems can be selected from a variety of different platforms including but not limited to ANDROID, iOS, WINDOWS, BLACKBERRY, and BLACKBERRY PLAYBOOK OS. In the illustrated embodiment, the first operating system 201 can be ANDROID. The second operating system 203 can be iOS. The third operating system 205 can be WINDOWS. The fourth operating system 207 can be BLACKBERRY. The fifth operating system 209 can be BLACKBERRY PLAYBOOK OS. Some operating systems can allow for third party applications to run on the operating system. The third party application can be downloaded from a website, such as an application store, or it can be installed on the mobile device 200 prior to the shipment of the mobile device 200. Furthermore, the application can be downloaded from one or more remote servers. In one or more embodiments, an administrator can push an application to the mobile device 200. In other embodiments, the application can be stored on a removable memory device that can be inserted into the mobile device 200. In other embodiments, the application can be downloaded via a wireless communication interface 228 residing on the mobile device 200.

In at least one embodiment, the server tunneling module 312 of an application server 300 and a respective device tunneling module 232 can be configured to allow the mobile device 200 to access the application server 300. Furthermore, the server tunneling module 312 can be further configured to allow only access to certain data stored on the application server 300. When the server tunneling module 312 is incorporated into an application running on the application server 300, the server tunneling module 312 can be configured to allow access only to data and other resources that the application is configured to use. The application can be configured to access only a portion of a storage medium on the application server 300. The mobile device 200 can be restricted such that it is only allowed to access the portion of the storage medium on the application server 300 that the application is allowed to access. In some embodiments, the application can be configured to allow access to one or more additional enterprise network 380 resources such as other application servers and the like. The secure tunnel model 312 can restrict the access of the mobile device 200 to those resources. In other embodiments, the server tunneling module 312 can restrict access based upon identification information that is received from the device tunneling module 332.

Figure 2:
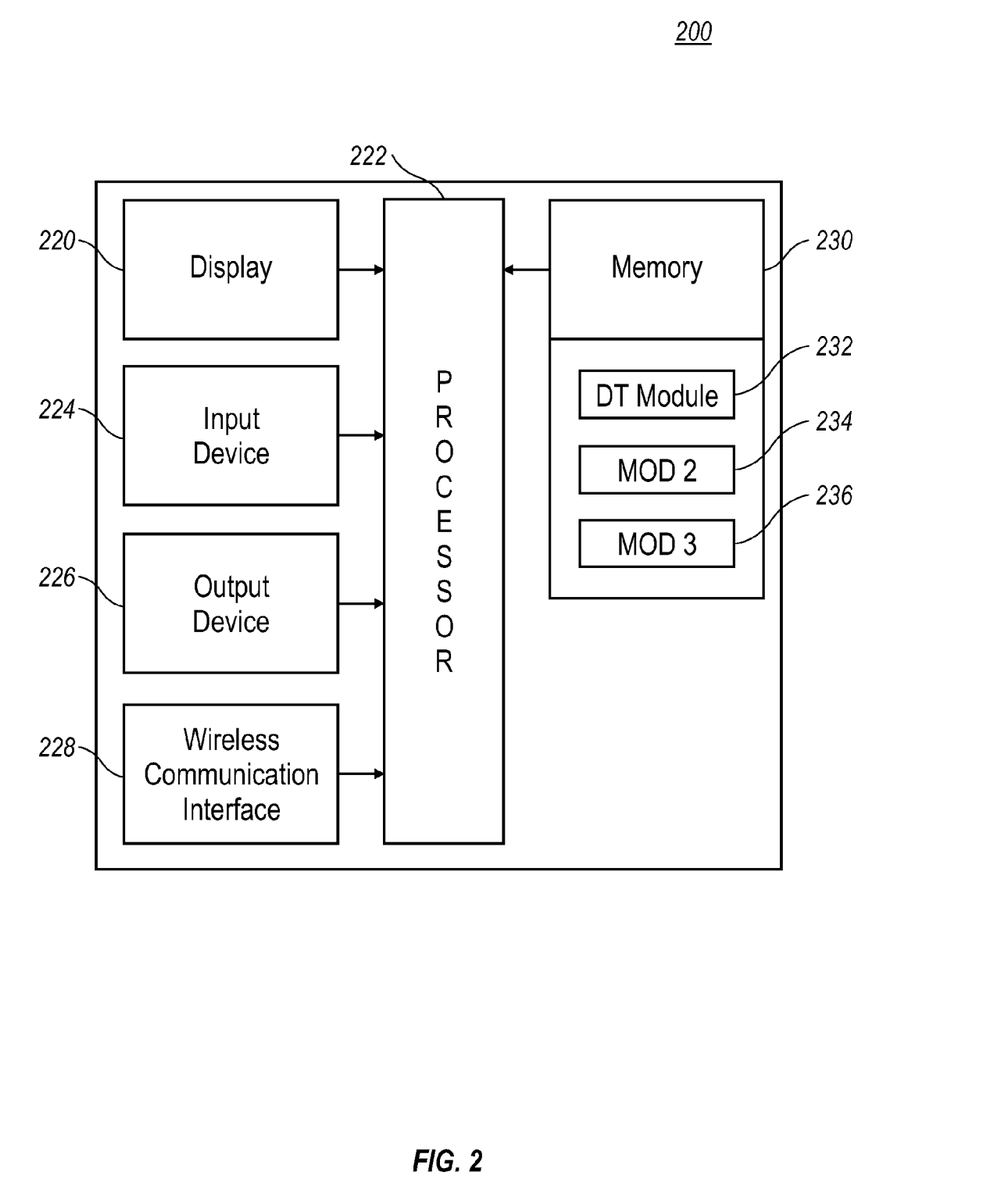
FIG. 2 is a block diagram of a mobile device in accordance with an exemplary embodiment.

An example of a mobile device 200 is illustrated in FIG. 2. The mobile device 200 can include one or more displays 220, one or more input devices 224, one or more output devices 226, one or more wireless communication interfaces 228, one or more memory devices 230, and at least one processor 222. The one or more displays 220 can include a display on a front of the device 200 and/or a display on the rear of the device 200. Additionally, when the mobile device is configured to slide or flip, the one or more displays 220 can be positioned on components of the mobile device 200 that allow the one or more displays 220 to be seen by an operator. The one or more displays 220 can be configured to display visual data to the operator of the mobile device. The one or more displays can be liquid crystal display (LCD), a projection display that displays the data on a near-by surface, light emitting diode (LED) display, or other technology that is configured to display visual data to an operator. The display 220 can also be a touchscreen device that functions both as a display 220 and an input device.

The one or more input devices 224 can include a variety of different input devices 224. For example, the one or more input devices 224 can include a keyboard, an action button, a navigation device, a power switch, volume keys, and direct input connections. The one or more output devices 226 can include one or more of: one or more vibrator motors, one or more LEDs, one or more lights, or one or more speakers. While the preceding list of possible input and output devices is provided, the present disclosure encompasses other input and output devices which are not specifically enumerated herein.

The wireless communication interface 228 can include one or more wireless communication interfaces. For example, the wireless communication interface 228 can be configured to allow for communication with a wireless communication network 10, as shown in FIG. 1. In other embodiments, the wireless communication interface 228 can include a short-range communication system such as a BLUETOOTH® communication module or a WI-FI® communication module (a communication module in compliance with IEEE 802.11b) and associated circuits and components.

The mobile device 200 can include one or more additional components that are not mentioned above. Specifically, the mobile device 200 can include a battery, one or more microphones, one or more cameras, one or more communication ports, and one or more audio jacks.

While a single processor 222 is illustrated, two or more processors can be implemented according to the present disclosure. Additionally, other processors can be arranged in series between the illustrated (and non-illustrated) components and the processor to further enable handling or processing of information.

Additionally, the present technology includes executing instructions on a mobile device 200. As indicated above, the mobile device 200 can include a memory 230 and a processor 222. In at least one implementation, the memory 230 can be a non-transitory memory. In other embodiments, a storage medium can be implemented instead of or in addition to the memory 230. The storage medium can also be a non-transitory storage medium and can be communicatively coupled to the processor. The processor 222 can be communicatively coupled to the memory 230. The processor 222 can be configured to execute instructions stored in the memory 230. The memory 230 can be configured to store modules. As illustrated, the memory 230 stores three modules: device tunneling (DT) module 232, MOD 2 (234), MOD 3 (236). The device tunneling module 232 can include instructions for execution by the processor 222 to allow the mobile device 200 to create a secure tunnel with an application server 300. The other modules MOD 2 (234) and MOD 3 (326) can be configured to store instructions for other applications or functions within a given application. In one or more embodiments, the device tunneling module 232 could be included within another module, for example a device application module (not shown). The device application module can store instructions required to execute a specific application. Examples of device application modules can include remote access applications, database applications, and other applications configured to interact with an application server 300. Furthermore, additional modules can be included which are not illustrated. In one or more embodiments, the device tunneling module 232 or additional modules can be stored on one or more mediums.

Figure 3:
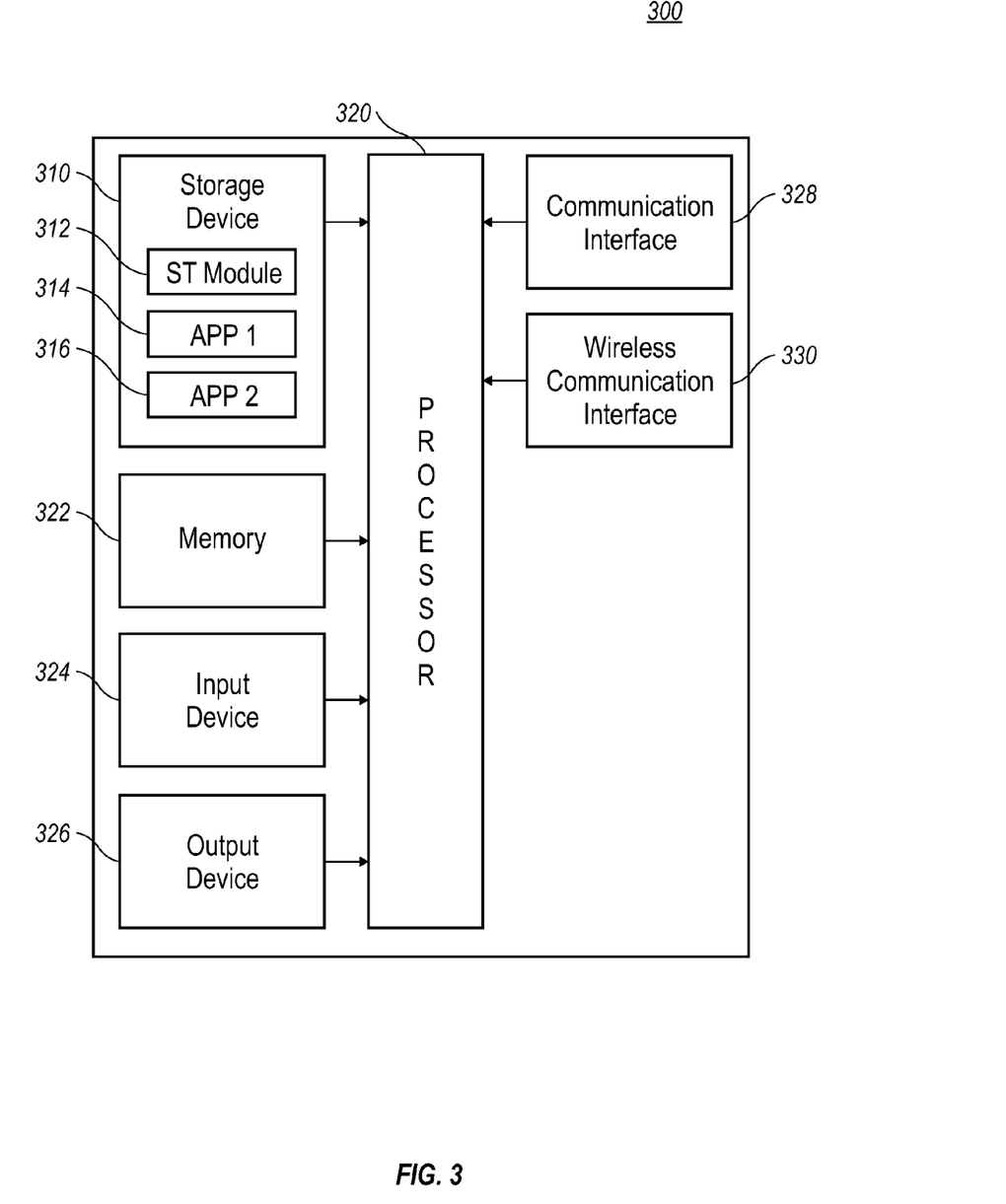
FIG. 3 is a block diagram of an application server in accordance with an exemplary embodiment.

An example of a server 300 is illustrated in FIG. 3. The server 300 can include one or more storage devices 310, one or more memory devices 322, one or more input devices 324, one or more output devices 326, one or more communication interfaces 328, one or more wireless communication interfaces 330, and at least one processor 320. While a single processor 320 is illustrated, two or more processors can be implemented according to the present disclosure. Additionally, other processors can be arranged in parallel or series between the illustrated (and non-illustrated) components and the processor to further enable handling or processing of information.

In another embodiment, the storage device can be a direct-attached storage (DAS) device (not shown). The DAS device can implement redundant array of independent disks (RAID) or clustering. In at least one embodiment, the server 300 can be communicatively coupled to network-attached storage (NAS) device. The one or more memory devices 322 can include RAM, ROM, flash and other memory devices that are configured for either long term or short term storage of data. The one or more input devices 324 can include a keyboard, a mouse, a touch sensor, a tablet surface, keys, or other devices that are configured to input data into the server 300. The one or more output devices 326 can include one or more of: one or more displays, one or more speakers, one or more vibration motors, or other devices which are configured to provide output that can be used by an operator.

The one or more communication interfaces 328 can be configured for wired communication. For example, the communication interfaces 328 include universal serial ports, parallel ports, Ethernet ports, and other wired connection ports.

While components of the mobile device 200 and server 300 are presented herein additional components can be included. Furthermore, certain components enumerated above can be omitted without departing from the disclosure.

Figure 4:
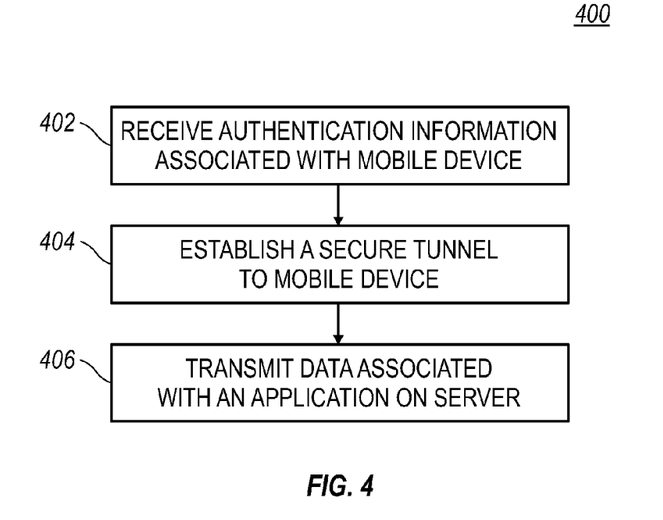
FIG. 4 is a flow chart illustrating a method to establish a secure connection between a server and a mobile device in accordance with an exemplary embodiment.
Figure 5:
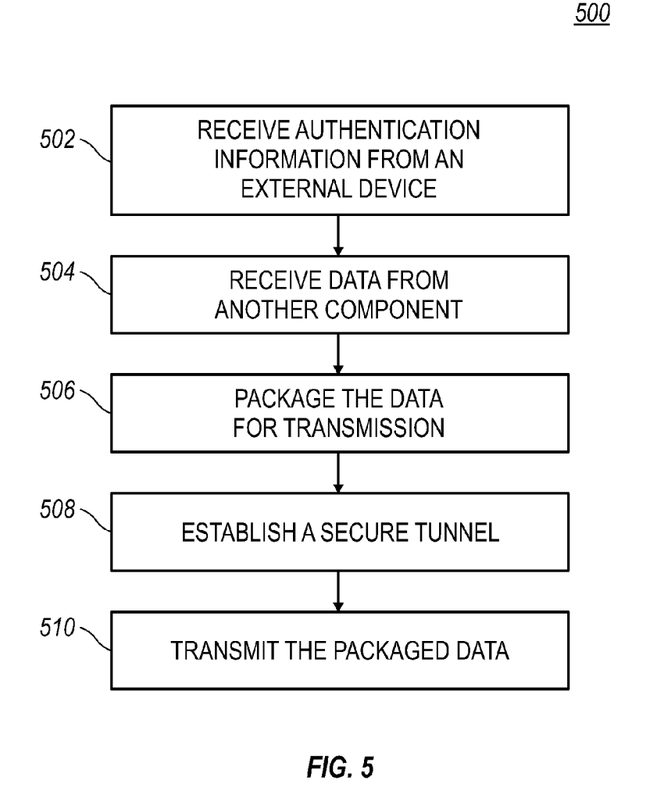
FIG. 5 is a flow chart illustrating another example method to establish a secure connection between a server and a mobile device in accordance with an exemplary embodiment.

The methods as presented in FIGS. 4 and 5 can be configured to allow communication between a mobile device 200 and a server 300.

An example of a method according to the present disclosure is presented in FIG. 4. The exemplary method 400 is provided by way of example, as there are a variety of ways to carry out the method. The method 400 described below can be carried out using a server 300 as described herein. Specifically, one or more of the steps of the method can be stored on the storage device 310 of the server 300. Additionally, the processor 320 can be configured to execute the instructions stored on the storage device 310. Various elements of other figures presented are referenced in explaining the exemplary method 400. Each block shown in FIG. 4 can represent one or more processes, methods, or subroutines carried out in the exemplary method. While the method 400 is described in a particular order, the present technology can implement the method 400 in a different order. As presented herein, the method 400 involves transmitting data between a server 300 and a mobile device 200. The present technology can also be used to transmit data from the mobile device 200 to the server 300.

The exemplary method 400 can begin at block 402. At block 402, the server 300 receives authentication information associated with a mobile device 200. For example, the authentication information associated with the mobile device 200 can be sent in response to a request that is received at the mobile device 200, such as an operator requesting information from the server 300. In this example, the authentication information can be sent to the server 300 over wireless network 10, then over the internet 12, then to the relay 20, then over the internet 12, and through a firewall 30 to the application server 300. In some embodiments, the firewall 30 will prevent this data from being transmitted to application server 300. In other embodiments, such as those where the firewall 30 prevents the authentication information from reaching the server 300, the server 300 can make a request to the mobile device 200 so that the mobile device 200 sends the authentication information to the server 300 in response to the request from the server. The authentication information associated with the mobile device 200 allows the server 300 to positively identify the mobile device 200 and determine the appropriate permissions associated with the mobile device 200. In yet another example, the authentication information can be sent from an administrator inside the enterprise network 380 to the application server 300. For example, the administrator can grant privileges to an operator of a mobile device 200. When the administrator grants privileges to the operator of the mobile device 200, the administrator can send the authentication information of the mobile device 200 to the appropriate application server 300. In at least one embodiment, the operator of the mobile device 200 can be granted privileges only with respect to a single application server 300 but not another application server 300. For example, the operator can only receive permission to access a first application server 302, but not a second application server 304 or third application server 306. The authentication information allows the server 300 to positively identify the mobile device 200. The authentication information allows the server 300 to establish a data secure tunnel as will be described below. After receiving authentication information associated with a mobile device 200, the method 400 can proceed to block 404.

At block 404, a secure tunnel is established to the mobile device. For example the secure tunnel is established between the mobile device and a server. The server 300 can establish the secure tunnel to the mobile device 200 based upon the authentication information associated with the mobile device 200. The authentication information allows the server 300 to set up an appropriate secure tunnel to the mobile device 200. The secure tunnel can be selected from one or more available secure tunnels. In one or more embodiments, the selection of the secure tunnel can be based upon a fastest connection given the desired amount of security requested. In other embodiments, the selection of the secure tunnel can be based upon other criteria such as availability of the components (such as the mobile device 200) to handle the desired level of encryption. After establishing the secure tunnel, the method 400 can proceed to block 406.

At block 406, data associated with an application on the server can be transmitted. For example, the server 300 transmits the data through the firewall 30 via the secure tunnel that has been established. The secure tunnel as described above allows the data to be transmitted to a mobile device 200. The application that is on the server 300 can be one of the applications as described herein. For example, the application can be a database application, a file management application, a file sharing application, a data entry application, or other application that require access to enterprise network 380 resources.

Prior to the transmission of the data, the data can be encrypted based upon the secure tunnel that has been selected. In selecting a secure tunnel, the method can determine the type of encryption that the mobile device 200 is capable of decrypting. Establishing, the secure tunnel includes encrypting the data before the data is transmitted from the server. The data can remain encrypted from when it leaves the server 300 until it reaches the mobile device 200 where the encrypted data can be decrypted by the mobile device 200. The decryption of the data by the mobile device 200 can require data from the device tunneling module 232. Examples of encryption can include advanced encryption standard (AES), data encryption standard (DES), Triple DES, and other similar encryption routines. In one or more of the encryption routines, a public key and a private key can be used to encrypt and decrypt the data.

Another example of a method according to the present disclosure is presented in FIG. 5. The exemplary method 500 is provided by way of example, as there are a variety of ways to carry out the method. The method 500 described below can be carried out using a server 300 as described herein. Specifically, one or more of the steps of the method can be stored on the storage device 310 of the server 300. Additionally, the processor 320 can be configured to execute the instructions stored on the storage device 310. Various elements of other figures presented are referenced in explaining the exemplary method 500. Each block shown in FIG. 5 can represent one or more processes, methods, or subroutines carried out in the exemplary method.

The exemplary method 500 can begin at block 502. In order to execute the steps as described herein, the server 300 can be running a server tunneling module 312 that is stored on a storage device 310. The instructions stored on the server tunneling module 312 can be executed by the processor 320. As indicated above, the server 300 can include more than one processor that is capable of executing the instructions. As described herein, the instructions need only be executed by one of the processors, when more than one processor 320 is included. The instructions can be executed by one or more processors according to a routine chosen by the server 300 to execute the instructions or according to the instructions.

At block 502, the server 300 receives authentication information from an external electronic device. In at least one embodiment, the authentication information can be received from a mobile device 200. In one example, the authentication information can be received from a device tunneling application on the mobile device 200. In another embodiment, the authentication information can be received from a mobile device management server. In yet another embodiment, the authentication information can be received from system administrator's electronic device. Once the authentication information is received, the authentication information can be stored on the server 300 in memory 322, the storage device 310, or both. After receiving authentication information from an external device, the method 500 can proceed to block 504.

At block 504, the server 300 receives the requested data from another component of the server 300. The server 300 can receive the requested data from another component of the server 300 such as another storage device 310 or memory 322. In another embodiment, the other component of the server is a DAS device. The DAS device can implement RAID or clustering. In at least one embodiment, the server 300 can be communicatively coupled to a NAS device. After receiving the requested data from another component, the method 500 can proceed to block 506.

At block 506, the server 300 packages the data for transmission. The data that is received from another component can be packaged for transmission. The packaging can include encrypting the data with a predetermined encryption algorithm. Examples of encryption can include AES, DES, Triple DES, and other similar encryption routines. In one or more of the encryption routines, a public key and a private key are used to encrypt the data. After packaging the data for transmission, the method 500 can proceed to block 508.

At block 508, the server 300 establishes a secure tunnel. The secure tunnel can be established using a protocol such as transport layer security (TLS). The secure tunnel that is established can include routing information such that the data is routed according to a predetermined path. In at least one embodiment, the predetermined path can include a relay 20. As illustrated in FIG. 1, the relay 20 can be communicatively coupled to the internet 12. In other embodiments, the relay 20 can be isolated from the internet and located on a wide area network (WAN) or other dedicated communication network. The relay allows for routing of information from the server 300 to the predetermined mobile device 200. After establishing a secure tunnel, the method 500 can proceed to block 510.

At block 510, the server 300 transmits the packaged data. The packaged data is transmitted along the predetermined secure tunnel to the mobile device 200. Once the packaged data reaches the mobile device 200, the mobile device can open and decrypt the packaged data.

In one or more embodiments, the methods as presented in FIGS. 4 and 5 can allow communication between a mobile device 200 and a server 300 without requiring an operator of the mobile device to input login credentials. As described herein, the methods receive authentication information that provides for receiving the authentication information without the operator entering login credentials. In at least another embodiment, the methods can further require that login credentials are used in addition to authentication information. In one embodiment, the additional login credentials can be transmitted once the secure tunnel is established. For example, after establishing a secure tunnel between the mobile device 200 and the server 300, the operator can enter login credentials over the secure tunnel to gain access to an application running on the server 300 or data associated with the server 300. Once access to the application is established, the mobile device 200 can access enterprise network resources that are associated with the particular server such as a NAS or the like.

In at least one embodiment, the instructions for executing one of the above methods can be stored on a server tunneling module (ST Module) 312. The server tunneling module 312 can be stored on a storage device 310 on the server 300. In other embodiments, the storage device 310 can be located on a separate component from the server 300. For example, the server tunneling module 312 can be stored on a DAS device. The server tunneling module 312 can be configured to store instructions to cause the server to receive authentication information associated with a mobile device 200 without a user entering login information. Additionally, the server tunneling module 312 can be configured to store instructions to cause the server 300 to establish a secure tunnel between the server 300 and mobile device 200 through at least one firewall 30 in response to verification of the authentication information, the secure tunnel allowing the mobile device 200 direct access to at least one application associated with the server 300. Furthermore, the server tunneling module 312 can be configured to store instructions to cause the server 300 to provide, to the mobile device 200, data associated with the at least one application associated with the server 300. The server tunneling module 312 can be further configured to store additional instructions to enable the server 300 to execute any of the above recited instructions described in relation to FIGS. 4 and 5. In at least one embodiment, the server tunneling module 312 can be included with a larger module or application. For example, server tunneling module 312 can be included with a database application, a file sharing application, a file management application, or other application which is configured to allow for remote access from a mobile device 200. When the server tunneling module 312 is included with the remote access application, the mobile device 200 can be allowed to access the resources that the remote access application is configured to allow access based upon the profile associated with the user of the mobile device 200 and/or the authentication information of the mobile device 200.

The server tunneling module 232 can be configured to store instructions that are to be executed by the processor 222. In one embodiment, the instructions can include instructions to request receipt of data from a server 300 via a secure tunnel. The instructions can further include instructions to transmit authentication information to the server

300. The authentication information can be mobile device identification data. The mobile device identification data can be one or more numbers, an alphanumeric sequence, or other sequence of characters that identifies the mobile device 200 to the server. In another embodiment, the authentication information can be data that identifies both the mobile device 200 and the operator of the mobile device 200. For example, the authentication information can be made up of an operator identifier data and mobile device identification data. In another example, the mobile device 200 can be configured to generate the authentication information based upon the operator identifier data and the mobile device identification data.

The instructions can further include instructions to receive the requested data, which was packaged and transmitted over the secure tunnel wherein the secure tunnel is between the mobile device 200 and the server 300, which is located on an enterprise network behind 380 one or more firewalls 30. In at least one embodiment, the server 300 is located behind two or more firewalls 30. The secure tunnel can be an endpoint to endpoint secure tunnel that allows for the packaged data to remain secure between the server 300 and the mobile device 200 by traveling along an encrypted secure tunnel.

While the above methods have been described in relation to the server 300 and mobile device 200, the present technology contemplates a system of devices. The system can be configured as explained above in relation to the methods. In one or more embodiments, the system can include a server 300, at least one firewall 30 securely coupled to the server 300, a relay 20 securely coupled to the at least one firewall 30, a wireless network 10 securely coupled to the relay 20, a mobile device 200 securely coupled to the wireless network 10. In one or more other embodiments, the authentication information can be transmitted to the server from an electronic device that is external to the server. In one embodiment, the mobile device 200 can include authentication information. In another embodiment, the authentication information can be from an administrator's electronic device which is external to the server. The server 300 can be configured to receive authentication information from the mobile device without a user entering login information.

The server 300 can further be configured to establish a secure tunnel between the server 300 and mobile device 200 through at least one firewall 30 in response to verification of the authentication information, the secure tunnel allowing the mobile device 200 direct access to at least one application associated with the server 300. Direct access as provided herein allows the mobile device 200 and the server 300 to securely share data between them. Specifically, the direct access can be provided to only allow access by the mobile device 200 to a particular application running on the server 300.

The particular application running on the server 300 can be one of the applications as described above. For example, the remote access applications, database applications, and other applications configured to interact with an application server 300. In one or more embodiments, the application can be configured to include a server tunneling module 312 therein, so that the server tunneling module 312 is located within the application. When the server tunneling module 312 is included with the application, the server tunneling module 312 allows access only to the application that is associated therewith. Furthermore, the server tunneling module 312 can be configured to allow access to data that is associated with the application. As indicated above, server tunneling module 312 can restrict the access of the mobile device 200 to a predetermined set of data on the server 300. The server tunneling module 312 can also prevent the mobile device 200 from accessing data on other components residing on the enterprise network 380. Still further, the server tunneling module 312 can allow access to enterprise network 380 components that are configured to exchange data with the application running on the server 300.

When direct access to only the application running on the server 300 is provided, the enterprise network 380 can be more secure since the mobile device does not access the entire enterprise network 380, but only a single server 300 and a single application running on the server 300. In this way, further communication beyond the server 300 can be restricted. The server 300 can further be configured to provide, to the mobile device 200, data associated with the at least one application associated with the server 300.

When the mobile device 200 is connected to the server 300 via the secure tunnel, the information exchanged over the secure tunnel is secure. The server 300 and mobile device 200 can be configured as indicated above. Furthermore, when the mobile device 200 is able to access the server 300 via the secure tunnel, the mobile device 200 can easily move within the wireless network. For example, the mobile device 200 can move between cells without the need to provide additional login information.

In one or more embodiments, the mobile device 200 can be configured to enable the execution of the methods as described above. The mobile device 200 can include a non-transitory memory 230 and a processor 222 coupled to the non-transitory memory 230. The mobile device 200 can further include additional components as described herein. In one or more embodiments, the processor 222 can be configured to execute instructions to request, in response to receiving an input into the mobile device 200, receipt of data from a server 300 via a secure tunnel. The processor 222 can be configured to execute instructions to transmit authentication information to the server 300. The processor 222 can be configured to execute instructions to receive the requested data, which was packaged and transmitted over the secure tunnel wherein the secure tunnel is between the mobile device 200 and the server 300, which is located on an enterprise network 380 behind one or more firewalls 30. The mobile device 200 can be further configured to allow the processor 222 to execute other instructions required to perform the above described methods.

As indicated above, the mobile device 200 can include a device tunneling module 232 stored on non-transitory medium such as memory 230. The device tunneling module 232 can be configured to be stored within a specific application on the mobile device 200 or the device tunneling module 232 can be located external to an application on the mobile device 200. The device tunneling module 232 can include instructions to cause the mobile device 200 to request receipt of data from a server 300 via a secure tunnel. The instruction can further cause the mobile device 200 to transmit authentication information to the server 300. The instruction can further cause the mobile device 200 to receive the requested data, which was packaged and transmitted over the secure tunnel wherein the secure tunnel is between the mobile device 200 and the server 300, which is located on an enterprise network 380 behind one or more firewalls 30. The device tunneling module 232 can be configured to store optional steps necessary to execute the above described methods.

The various embodiments described above are provided by way of illustration only and should not be construed to limit the scope of the disclosure. The present disclosure applies to mobile devices which are capable of connecting to one or more remote servers that are located behind one or more firewalls. The present technology also includes the servers that are located behind the one or more firewalls. Those skilled in the art will readily recognize various modifications and changes that may be made to the principles described herein without following the example embodiments and applications illustrated and described herein, and without departing from the scope of the disclosure.

What is claimed is:

1. A server configured to be located on an enterprise network behind one or more firewalls comprising:
   a non-transitory memory;
   a processor communicatively coupled to the non-transitory memory;
   the processor configured to execute instructions to:
   receive, from an administrator within the enterprise network, authentication information associated with a mobile device located outside of the enterprise network, the authentication information being sent by the administrator on behalf of a user of the mobile device in response to a request from the server to the mobile device, wherein the request is associated with a desired amount of security between the server and mobile device;
   establish a secure tunnel between the server and mobile device through at least one firewall in response to verification of the received authentication information, the secure tunnel providing the mobile device direct access to a single application associated with the server and preventing the mobile device from accessing data on the enterprise network not associated with the single application, wherein establishing the secure tunnel comprises selecting the secure tunnel, from a plurality of secure tunnels that satisfy the desired amount of security, based on connection speeds of the plurality of secure tunnels, and wherein establishing the secure tunnel between the server and mobile device does not require the user of the mobile device to input the authentication information and login credentials; and
   provide, to the mobile device via the established secure tunnel, in response to a request from the mobile device, data associated with the single application associated with the server, wherein the data associated with the single application is encrypted based on the desired amount of security and the request from the mobile device includes login credentials of the user.

2. The server as recited in claim 1, wherein the received authentication information is generated by an electronic device located within the enterprise network.

3. The server as recited in claim 1, wherein the received authentication information is generated by a mobile device management server located within the enterprise network.

4. The server as recited in claim 1, wherein the data associated with the single application associated with the server is located on a storage device located on the server.

5. The server as recited in claim 1, wherein the data associated with the single application associated with the server is located on a data storage device, within the enterprise network, that is securely coupled to the server.

6. The server as recited in claim 1, wherein the processor is further configured to execute instructions to package the data, the packaging of the data for transmission includes encrypting the data.

7. The server as recited in claim 6, wherein the secure tunnel is an endpoint to endpoint secure tunnel that allows for the packaged data to remain secure between the server and the mobile device by traveling along an encrypted secure tunnel.

8. The server as recited in claim 1, wherein the authentication information is a mobile device identification number.

9. The server as recited in claim 1, wherein the single application associated with the server is one of a database application, a file management application, or an analytic application.

10. The server as recited in claim 1, wherein establishing the secure tunnel comprises selecting the secure tunnel that has a fastest connection speed from the plurality of secure tunnels that satisfy the desired amount of security.

11. A mobile device comprising:
    a non-transitory memory;
    a processor coupled to the non-transitory memory; and
    the processor configured to execute instructions to:
    send a request, in response to receiving an input into the mobile device, for receipt of data from a server via a secure tunnel, the data being associated with a single application associated with the server, wherein the data associated with the single application is encrypted based on a desired level of encryption and the request includes login credentials of a user;
    receive the requested data transmitted over the secure tunnel, wherein the secure tunnel is established between the mobile device and the server, with the mobile device being located outside of an enterprise network and the server located within the enterprise network behind one or more firewalls, wherein the secure tunnel is established in response to verification of authentication information associated with the mobile device transmitted by an administrator, on behalf of a user of the mobile device, within the enterprise network to the server in response to a request from the server to the mobile device, wherein the request is associated with the desired level of encryption, and wherein establishing the secure tunnel between the mobile device and the server does not require the user of the mobile device to input the authentication information and the login credentials; and
    wherein the secure tunnel provides the mobile device direct access to the single application associated with the server and prevents the mobile device from accessing data on the enterprise network not associated with the single application, and wherein the secure tunnel is established based on an availability of the mobile device to handle the desired level of encryption.

12. The mobile device as recited in claim 11, wherein the authentication information is a mobile device identification number.

13. The mobile device as recited in claim 11, wherein the authentication information is a mobile device identification number and login data.

14. The mobile device as recited in claim 11, wherein the secure tunnel is an endpoint to endpoint secure tunnel that allows for the data to remain secure between the server and the mobile device by traveling along an encrypted secure tunnel.

15. A system comprising:
a server located within an enterprise network;
a firewall securely coupled to the server;
a relay securely coupled to the firewall;
a wireless network securely coupled to the relay;
a mobile device securely coupled to the wireless network and located outside of the enterprise network;
the mobile device having authentication information stored thereon;
the server securely coupled to the firewall and having instructions stored thereon to cause the server to:
execute a single application configured to allow the mobile device to access data associated with the single application;
receive, from an administrator within the enterprise network, authentication information associated with the mobile device, the authentication information being sent by the administrator on behalf of a user of the mobile device in response to a request from the server to the mobile device, wherein the request is associated with a desired amount of security between the server and mobile device; and
establish a secure tunnel between the server and mobile device through at least one firewall and relay in response to verification of the received authentication information, the secure tunnel providing the mobile device direct access to the single application associated with the server;
providing, to the mobile device via the established secure tunnel, in response to a request from the mobile device, data associated with the single application, wherein the data associated with the single application is encrypted based on the desired amount of security and the request from the mobile device includes login credentials of the user; and
preventing, via the established secure tunnel, the mobile device from accessing data on the enterprise network not associated with the single application, wherein establishing the secure tunnel comprises selecting the secure tunnel, from a plurality of secure tunnels that satisfy the desired amount of security, based on connection speeds of the plurality of secure tunnels, and wherein establishing the secure tunnel between the server and mobile device does not require the user of the mobile device to input the authentication information and login credentials.

16. The system as recited in claim 15, wherein the single application associated with the server is one of a database application, a file management application, or an analytic application.

17. The system as recited in claim 15, wherein the secure tunnel is an endpoint to endpoint secure tunnel that allows for the data to remain secure between the server and the mobile device by traveling along an encrypted secure tunnel.

18. The system as recited in claim 15, wherein the data associated with the single application associated with the server is located on a storage device located on the server.

19. The system as recited in claim 15, wherein the authentication information is a mobile device identification number.

20. The system as recited in claim 15, wherein establishing the secure tunnel comprises selecting the secure tunnel that has a fastest connection speed from the plurality of secure tunnels that satisfy the desired amount of security.

21. A non-transitory computer readable medium comprising instructions for execution by a processor to:
receive, by a server located on an enterprise network behind at least one firewall, authentication information associated with a mobile device located outside of the enterprise network, the authentication information being sent from an administrator, on behalf of a user of the mobile device, within the enterprise network in response to a request from the server to the mobile device, wherein the request is associated with a desired level of encryption;
establish a secure tunnel between the server and mobile device through the at least one firewall in response to verification of the received authentication information, the secure tunnel providing the mobile device direct access to a single application associated with the server and preventing the mobile device from accessing data on the enterprise network not associated with the single application, wherein the secure tunnel is established based on an availability of the mobile device to handle the desired level of encryption, wherein establishing the secure tunnel between the server and mobile device does not require the user of the mobile device to input the authentication information and login credentials; and
provide, to the mobile device via the established secure tunnel, in response to a request from the mobile device, data associated with the single application associated with the server, wherein the data associated with the single application is encrypted based on the desired level of encryption and the request from the mobile device includes login credentials of the user.

* * * * *